Aug. 16, 1966 J. H. AUER, JR 3,267,425

COMPOSITE SENSOR SIGNAL COMMUNICATION SYSTEM

Filed Feb. 4, 1964 3 Sheets-Sheet 1

INVENTOR.
J.H. AUER JR.
BY
Forest B. Hitchcock
HIS ATTORNEY

COMPOSITE SENSOR SIGNAL COMMUNICATION SYSTEM

Filed Feb. 4, 1964 3 Sheets-Sheet 2

INVENTOR.
J.H. AUER JR.
BY Forest B. Hitchcock
HIS ATTORNEY

INVENTOR.
J.H.AUER JR.
BY [signature]
HIS ATTORNEY

United States Patent Office 3,267,425
Patented August 16, 1966

3,267,425
COMPOSITE SENSOR SIGNAL COMMUNICATION SYSTEM

John H. Auer, Jr., Fairport, N.Y., assignor to The General Signal Corporation, Rochester, N.Y., a corporation of New York Filed Feb. 4, 1964, Ser. No. 342,467
10 Claims. (Cl. 340—38)

This invention relates to data communication systems, and more particularly to means for communicating data relating to traffic conditions in the form of a composite signal.

In systems for automatically controlling traffic from remote locations, it is necessary to obtain data relating to traffic conditions at various locations along the length of highway to be controlled. This requires use of numerous vehicle detectors, in order to obtain an accurate representation of traffic conditions on which to base operation of traffic control devices. One way in which this is accomplished is by supplying signals provided from a large number of vehicle detectors to a computer which then produces control signals at its output in accordance with the received traffic condition signals. However, the computer is often located at a great distance from the vehicle detectors. Under such circumstances, either a plurality of communication circuits or costly carrier-type communication networks have heretofore been required in order to furnish the detector signals to the computer. The instant invention provides a novel means for obviating the requirements of either a multitude of communication circuits or complex modulating and demodulating equipment for such system, and instead enables the system to operate with but a single communication circuit between the detectors and the computer, without requiring the use of carrier-type communication circuits.

The invention provides means for communicating a composite sensor signal which comprises pulses occurring at a rate proportional to a first analog voltage and with a duty cycle proportional to a second analog voltage. The signal is generated in such manner that its frequency is equal to average traffic volume, and its duty cycle is equal to average traffic lane occupancy.

In the novel system herein disclosed, signals are supplied from a large number of vehicle detectors to an analog computer in which average volume and average lane occupancy are computed, based upon these signals. The analog voltages representing average volume and average lane occupancy are then utilized for controlling an encoder in such manner that a composite sensor signal is generated. This composite sensor signal is representative of the average volume and average lane occupancy obtained from the plurality of vehicle detectors. The composite sensor signal has the same form as the signal supplied from an individual vehicle detector, and, if applied to a decoder comprising a volume and lane occupancy computer, enables the computer to produce volume and lane occupancy signals representing the average of the volume and lane occupancy data from which it was created. Thus, the composite sensor signal is an artificial simulated vehicle detector signal with frequency and duty cycle representative of average volume and average lane occupancy respectively, derived from information supplied by a plurality of vehicle detectors, permitting these average traffic parameters to be represented and transmitted in the form of a single detector signal. Moreover, in addition ot derivation of volume and lane occupancy information from this signal, it is also possible to derive speed information therefrom.

One object of this invention is to provide means for producing a simulated vehicle detector output signal representing an overall average of traffic conditions as sensed by a plurality of vehicle detectors situated along a roadway.

Another object is to provide means for converting average analog volume and lane occupancy signals into a single digital signal for the purpose of communicating volume and lane occupancy signals to a digital-to-analog converter wherein the analog volume and lane occupancy signals are reconstructed.

Another object is to provide a system for communicating average volume and average lane occupancy data in the form of repetitive pulses having a controllable pulse repetition rate and controllable duty cycle, wherein the pulse repetition rate is dependent upon average volume and the duty cycle is dependent upon average lane occupancy.

Another object is to provide a system for communicating average volume and average lane occupancy data derived from traffic moving in both directions along a highway when no preferential offset is called for, and from traffic moving in a preferential direction only when existence of a preferential offset in that direction has been established.

The invention contemplates a system for communicating average volume and average lane occupancy data over a single circuit, which comprises an encoder including means responsive to a voltage analog of average volume for repetitively generating a sawtooth voltage of average slope porportional to the average volume, means responsive to the sawtooth voltage and a voltage analog of the average lane occupancy for providing an output voltage of a first constant amplitude when the average lane occupancy voltage analog amplitude exceeds the instantaneous sawtooth voltage amplitude and an output voltage of a second constant amplitude when the instantaneous sawtooth voltage amplitude exceeds the average lane occupancy voltage analog amplitude, and a decoder including switching means responsive to the first and second amplitudes, and computing means providing traffic parameter analog voltages in response to operation of the switching means. Additional switching means are provided in the encoder for the purpose of supplying volume and lane occupancy information to the encoder orginating with traffic moving only in a preferential direction whenever a preferential offset in that direction is required.

The foregoing and other objects and advantages of the invention will become apparent from the following detailed description when read in conjunction with the accompanying drawings in which.

Figure 1:
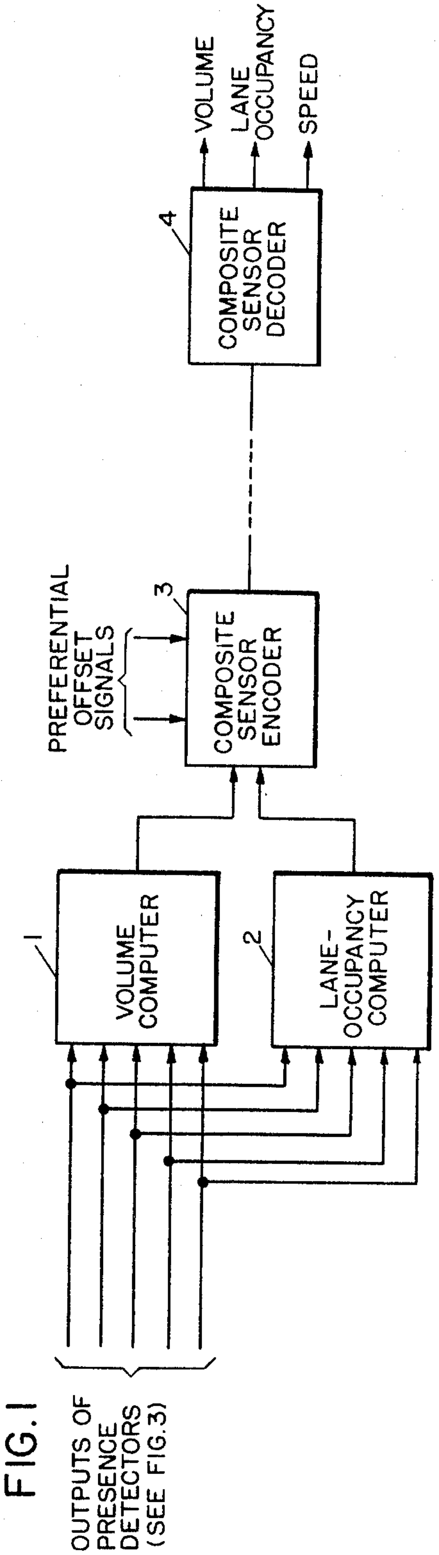
FIG. 1 is a block diagram of a system for communicating traffic data incorporating the instant invention.

FIG. 1 represents a traffic data communication system incorporating the circuitry of the instant invention. The system comprises a volume computer 1 and a lane occupancy computer 2, both receiving inputs from vehicle presence detectors, such as those described in H. C. Kendall et al. Patent No. 3,042,303, issued July 3, 1962. The vehicle detectors used in the system are situated along the portion of a highway to be monitored. The volume computer provides an output voltage analog having an amplitude proportional to average traffic volume as sensed by the presence detector inputs supplied thereto, while the lane occupancy computer provides an output voltage analog having an amplitude proportional to the total time during a predetermined interval in which the vehicle detectors actually sense presence of a vehicle. Volume computer 1 is illustrated in greater detail in FIG. 2, while lane occupancy computer 2 is disclosed in J. H. Auer, Jr. et al., application Ser. No. 305,967, filed Sept. 3, 1963. Average volume and average lane occupancy signals are supplied by volume computer 1 and lane occupancy computer 2, respectively, to the inputs of a composite sensor encoder 3, which is illustrated in greater detail in FIG. 4.

The composite sensor encoder operates as an analog-to-digital converter, in that it converts the analog average volume and average lane occupancy signals into a single digital signal having a pulse repetition rate dependent upon average volume and a duty cycle dependent upon average lane occupancy. In addition, preferential offset signals supplied by an offset computer, such as that described in J. H. Auer, Jr., et al., application Ser No. 305,967, filed Sept. 3, 1963, are applied to the composite sensor encoder whenever an inbound or an outbound offset is called for. These signals provide weighing factors to the composite sensor encoder, depending upon whether or not a preferential offset is called for and whether the required preferential offset is in the inbound or outbound direction.

The signal produced by the composite sensor encoder is communicated to a remote location, at which is situated a composite sensor decoder 4. This decoder, which is shown in greater detail in FIG. 7, operates as a digital-to-analog converter, in that the digital signal received from the composite sensor encoder is reconverted into analog signals representing the average volume and average lane occupance data supplied to the composite sensor encoder. Additional capability for computing speed may be provided at the decoder. Thus, the system permits communication of analog traffic parameters in digital form.

Figure 2:
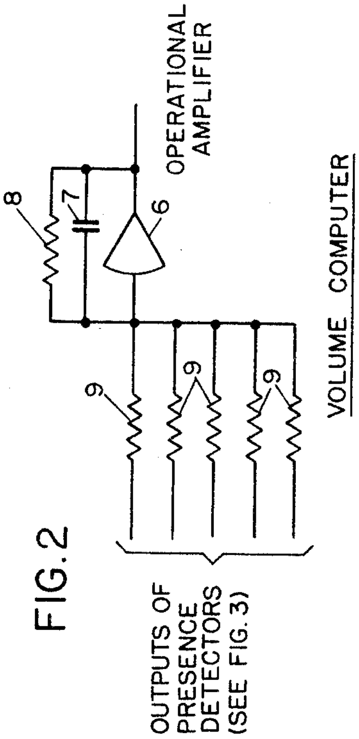
FIG. 2 is a schematic diagram of a volume computer, such as that used in the system of FIG. 1.

Although traffic volume computers, such as volume computer 1 of FIG. 1, are well knonw in the art, one such volume computer admirably suited to incorporation in the system of FIG. 1, is shown in FIG. 2. This circuit comprises an operational amplifier 6 having a feedback capacitor 7 shunted across its input and output. A feedback resistor 8 is connected in parallel with capacitor 7, for the purpose of permitting charge stored on capacitor 7 to bleed off at a controlled rate. A plurality of input resistors 9 are coupled to the input of operational amplifier 6. Presence detectors such as those described in the aforementioned Kendall et al. Patent 3,042,303, are coupled to separate ones of the input resistors, so that a vehicle sensed by a presence detector supplies a uniform quantity of charge to the input of operational amplifier 6 through a single input resistor. Those skilled in the art will recognize that the volume computer of FIG. 2 comprises a short time-constant integrator having a plurality of summing inputs. Thus, the rate at which quantities of charge are supplied to the input of operational amplifier 6 is dependent upon the rate at which each presence detector is actuated, which in turn is dependent upon the rate at which individual vehicles pass the sensing location. This rate represents traffic volume. By use of summing resistors 9, the overall input to operational amplifier 6 represents the average of traffic volume sensed by each individual vehicle detector and thus the output of volume computer 2 represents the average of traffic volume sensed by the plurality of detectors.

Figure 3:
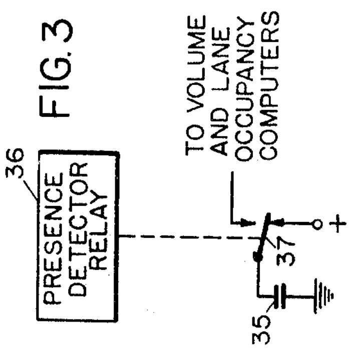
FIG. 3 is a schematic diagram of a pulse generator for supplying controlled energy pulses to the input of the volume computer of FIG. 2 in response to vehicle detections.

FIG. 3 is a schematic diagram of the means by which controlled quantities of charge are supplied to any one of the volume computer input resistors 9 of FIG. 2. This is achieved by use of a capacitor 35 to couple the heel of a contact 37 of a presence detector relay 36, to ground. The relay back contact is coupled to a source of voltage, while the front contact is coupled to one of input resistors 9 of FIG. 2. Thus, when no vehicle is detected, relay 36 is deenergized, and capacitor 35 rapidly acquires a fixed charge. When a vehicle is detected, relay 36 is energized, and capacitor 35 discharges through front contact 37 and the selected one of input resistors 9 to which it is coupled. The RC time constant of capacitor 35 and the selected one of input resistors 9 is such that the capacitor is substantially fully discharged during the interval in which even the fastest moving and shortest length vehicle in the stream of traffic is detected. After the vehicle has left the detection zone, detector relay 36 deenergizes, and capacitor 35 again acquires a charge, for use in supplying a fixed quantity of charge to the input of the volume computer when the next vehicle is detected.

Figures 4, 6:
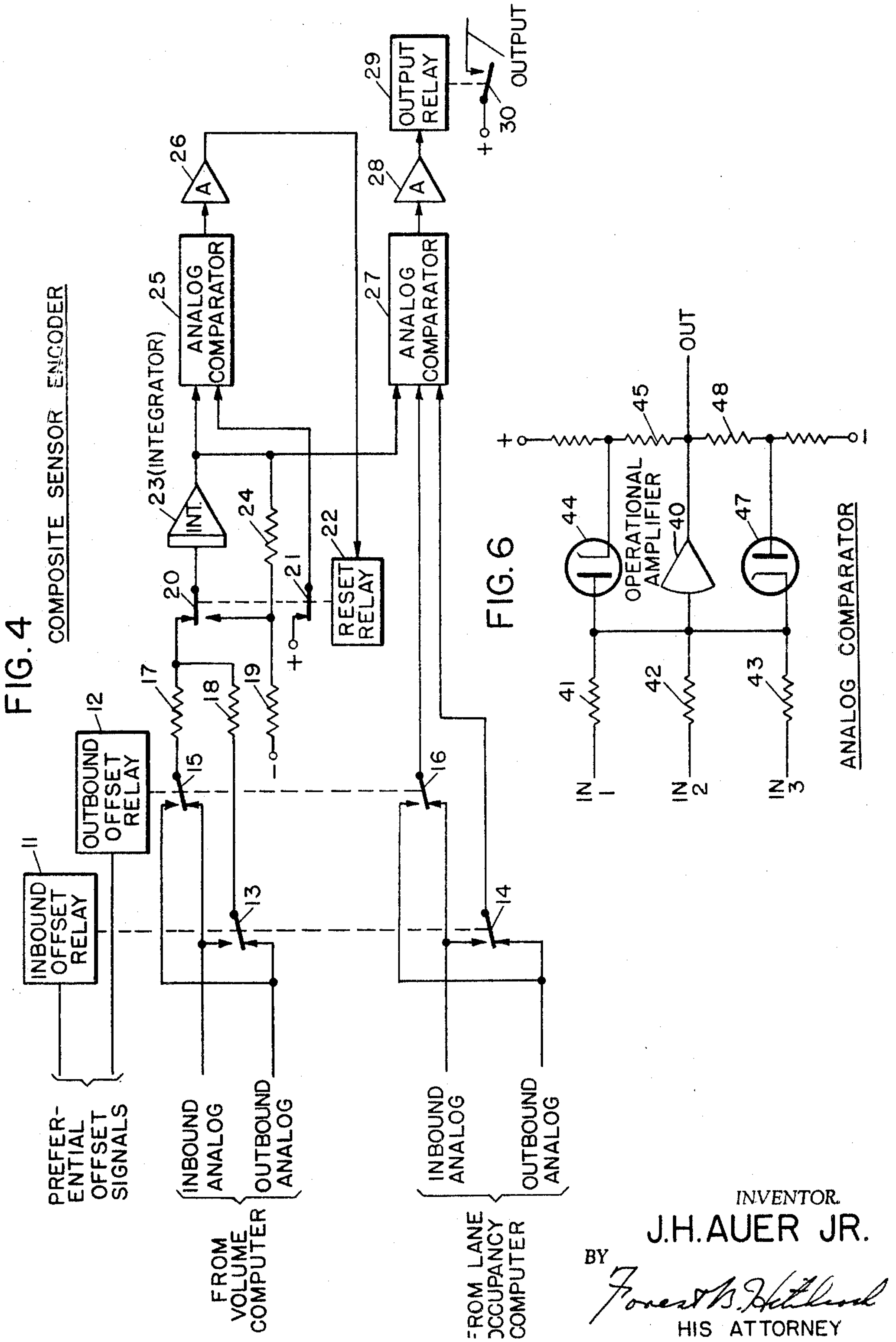
FIG. 4 is a part schematic and part block diagram of the encoder used in the system.
FIG. 6 is a schematic diagram of an analog comparator which produces a large amplitude positive or negative output voltage in acordance with polarity of the algebraic sum of a plurality of input voltages supplied thereto.

FIG. 4 shows the arrangement of components in the system encoder. Preferential offset signals may be supplied from an offset computer, such as that described in J. H. Auer, Jr., et al., application Ser. No. 305,967, filed Sept. 3, 1963, whenever an inbound or outbound offset is called for, to an inbound offset relay 11 or outbound offset relay 12, respectively. Alternatively, the preferential offset signals may be furnished by manual means, if so preferred. Analog voltages representative of average outbound and inbound volume are supplied respectively to back contacts 13 and 15 of inbound offset relay 11 and outbound offset relay 12, respectively, from the offset computer. In addition, the outbound volume analog signal is supplied to front contact 15 of outbound offset relay 12, while the inbound volume analog signal is supplied to front contact 13 of inbound offset relay 11. The heel of contact 15 is coupled through a summing resistor 17 to a front contact 20 of a reset relay 22. Similarly, the heel of contact 13 is coupled through a summing resistor 18, preferably of ohmic value equal to resistor 17, to front contact 20 of reset relay 22. A negative reference voltage is coupled through a current limiting resistor 19 to back contact 20 of the reset relay.

The heel of contact 20 is coupled to the input of an integrator 23 having a feedback resistor 24 coupled between the integrator output and back contact 20. In addition, the output of integrator 23 furnishes one input to an analog comparator circuit 25. A second input to the analog comparator is supplied from a positive reference voltage through a front contact 21 of reset relay 22. Output voltage from the analog comparator is amplified through a power amplifier 26 and applied to reset relay 22, for control of the relay in accordance with the polarity of voltage applied thereto.

A second analog comparator 27 is utilized in the encoder, and receives a first input from the output of integrator 23, a second input from the heel of a contact 14 of inbound offset relay 11, and a third input from the heel of a contact 16 of outbound offset relay 12. A voltage analog of inbound lane occupancy is supplied from the lane occupancy computer to back contact 16 and front contact 14, while a voltage analog of outbound lane occupancy is supplied from the volume computer to back contact 14 and front contact 16.

Output voltage provided by analog comparator 27 is amplified through a power amplifier 28 and applied to an output relay 29, which is energized and deenergized in response to the polarity of this voltage coupled thereto. Encoder output voltage is supplied from a front contact 30, which upon closing, couples a source of positive voltage to this contact.

In considering operation of the encoder, assume first that no preferential offset is called for by the offset computer, so that both inbound offset relay 11 and outbound offset relay 12 are deenergized. With neither an inbound nor outbound volume analog signal supplied to the input of integrator 23, assuming relay 22 is energized, the positive reference voltage supplied to analog comparator 25 through closed front contact 21 produces a negative voltage at the output of the analog comparator. The polarity of this voltage is inverted by amplifier 26, so that a positive voltage is supplied to relay 22, maintaining the relay in its energized condition. Actually, when the circuit is first energized, relay 22 is in a deenergized condition. However, back contact 20 then supplies negative reference voltage through resistor 19 to integrator 23, which in turn provides a positive input voltage to analog comparator 25 so as to energize relay 22.

Now with offset relays 11 and 12 deenergized, assume positive inbound and outbound volume analog signals are supplied through back contacts 15 and 13, respectively, to the input of integrator 23. Negative voltage is then supplied by integrator 23 to analog comparator 25. As long as the magnitude of this negative voltage is below that of the positive reference voltage supplied to the comparator, the polarity of output voltage supplied by the comparator remains negative, and relay 22 remains energized. However, the magnitude of negative voltage supplied from the integrator eventually increases to a value which exceeds the magnitude of positive reference voltage supplied to the comparator, since the magnitude of integrator output voltage is dependent upon the product of integrator input voltage and the time during which this input voltage is applied. When this occurs, the polarity of output voltage supplied by the comparator becomes positive, causing application of a negative output voltage to relay 22 from amplifier 26. Relay 22 thereby deenergizes, permitting the voltage stored on integrator 23 to leak off through feedback resistor 24 and back contact 20. Moreover, negative voltage is supplied to the input of integrator 23 through resistor 19. The values of resistors 19 and 24 are sufficiently small to permit a rapid decrease in integrator output voltage from a highly negative value to zero. As the integrator output voltage starts to become positive, due to application of the negative reference voltage at its input, output voltage from comparator 25 immediately becomes negative. Positive voltage is thus supplied from amplifier 26 to relay 22, causing energization of the relay. Hence, when relay 22 energizes, integrator output voltage is substantially zero, and a new encoder output voltage cycle is initiated. The significance of the encoder output voltage cycle is more fully described infra.

Since resistors 17 and 18 are equal, the equivalent integrator input voltage is the average of the two analog inputs supplied thereto. Moreover, since continuous voltage of varying amplitude is supplied from the volume and lane occupancy computers, average slope of the integrator output voltage is also proportional to the average input voltage. Furthermore, since the integrator input voltages supplied by the volume and lane occupancy computers are always positive, the integrator output voltage responds by increasing in a negative direction. Hence, integrator output voltage assumes the form of a sawtooth wave, increasing from zero in the negative direction to a maximum value equal in amplitude to the positive reference voltage, and then returning to zero very quickly. Average slope of the sawtooth is directly proportional to the average volume input data. Thus, the sawtooth frequency, or repetition rate, is also directly proportional to average volume.

Duty cycles of output relay 29 are a function of analog lane occupancy. Assume that voltage supplied by the lane occupancy computer is always positive. Without receipt of preferential offset signals, back contacts 14 and 16 of relays 11 and 12, respectively, are closed. Hence, the analog voltages of inbound and outbound lane occupancy are supplied to analog comparator 27. These inputs by themselves, would produce a negative output voltage from analog comparator 27, in turn supplying a positive output voltage from amplifier 28 to output relay 29, energizing the relay. However, a third input to analog comparator 27, is furnished from integrator 23. The negative output voltage of integrator 23, of itself, would produce a positive output voltage from analog comparator 27, thus deenergizing relay 29. However, as already shown, the output voltage of integrator 23 is cyclic. Hence, during the time in which the sum of lane occupancy input voltage supplied to analog comparator 27 exceeds in magnitude the volume voltage supplied by the output of integrator 23, the analog comparator output voltage is negative, and relay 29 is energized. However, when the voltage supplied from integrator 23 exceeds in magnitude the sum of lane occupancy analog voltages supplied to analog comparator 27, the analog comparator output voltage is positive, and relay 29 is deenergized. Relay 29 remains deenergized until integrator 23 is reset as previously described, and the encoder output voltage cycle repeats. Thus, the output relay is energized throughout a fraction of each encoder output voltage cycle which is proportional to the lane occupancy level. This fraction may also be referred to as the output relay duty cycle.

Figures 5A, 5B, 5C, 7:
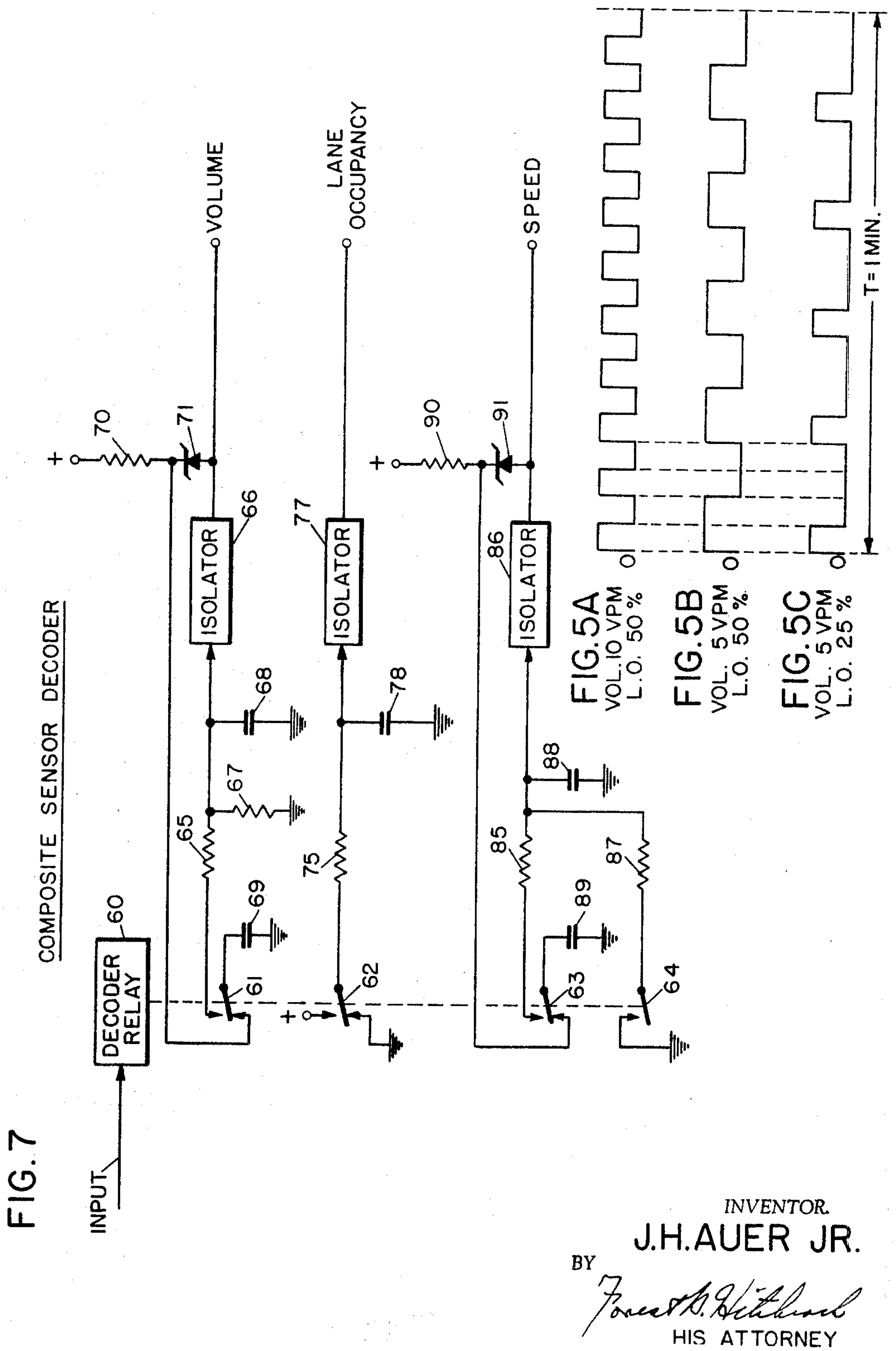
FIGS. 5A–5C are encoder output voltage waveforms used to aid in explaining operation of the encoder.
FIG. 7 is a part schematic and part block diagram of the decoder used in the system.

FIGS. 5A, 5B and 5C are illustrations of output voltage waveforms produced by the encoder of FIG. 4, assuming time interval T to be one minute in duration. FIG. 5A is an illustration of output voltage under average volume conditions of 10 vehicles per minute at 50% average lane occupancy. FIG. 5B is an illustration of output voltage under average volume conditions of 5 vehicles per minute, but still at an average lane occupancy of 50%, indicating an average traffic speed of one-half that for the conditions of FIG. 5A. FIG 5C is an illustration of output voltage under average volume conditions of 5 vehicles per minute, but at an average lane occupancy of 25%, indicating an average traffic speed equal to that for the conditions of FIG. 5A. It should be noted that the pulse repetition rate, corresponding to average volume, is identical in FIGS. 5B and 5C, and that the pulse repetition rate of FIG. 5A is twice that of FIGS. 5B and 5C. It should also be noted that the duty cycle, or total time during interval T in which output relay 29 of FIG. 4 is energized, corresponding to average lane occupancy, is identical in FIGS. 5A and 5B, and that the duty cycle of FIG. 5C is one-half that of FIGS. 5A and 5B.

During periods of preferential offset, either relay 11 or 12 of FIG. 4 is energized. If relay 11, for example, is energized, due to existence of an inbound offset, only the inbound volume analog voltage is used in the determination of cycle rate. Resistors 17 and 18 are equal and connected in parallel, thereby constituting an effective input resistor of one-half the ohmic value of either resistor 17 or 18 alone. Hence, inbound volume analog voltage has twice the effect on the output of integrator 23 which it otherwise would if both inbound and outbound analog voltages were coupled separately through resistors 17 and 18, respectively. Similarly, the lane occupancy analog voltages are switched in order to likewise affect the output of analog comparator 27 by eliminating the effect of lane occupancy data in the non-preferential direction and doubling the effect of lane occupancy data in the preferential direction. This can be seen by referring to FIG. 6, which is a schematic diagram of analog comparator 27 of FIG. 4, since three inputs are supplied thereto. Obviously, if any one input to the analog comparator is left uncoupled, so that only two inputs are utilized, the circuit then represents analog comparator 25 of FIG. 4.

The analog comparator of FIG. 6 comprises an operational amplifier 40 having three inputs coupled thereto through separate resistors 41, 42 and 43, which are all of equal ohmic value. A series-connected diode 44 and resistor 45 provides a first feedback path around amplifier 40, with the anode of diode 44 coupled to the input of operational amplifier 40. A second feedback circuit around amplifier 40 is provided by a series-connected diode 47 and resistor 48, with the cathode of diode 47 coupled to the input of operational amplifier 40. The cathode of diode 44 is resistively coupled to the source of positive voltage, while the anode of diode 47 is resistively coupled to the source of negative voltage.

In operation, assume the algebraic sum of voltages applied to the input of operational amplifier 40 is of negative polarity. Because of the phase inversion inherent in operational amplifiers, a positive output voltage is provided from operational amplifier 40. When the amplitude of this output voltage exceeds a threshold value, determined by preexisting voltage at the plate of diode 47, the diode conducts, since it is biased in the forward direction.

As the polarity of input voltage swings in a positive direction, diode 47 begins to cut off, opening the feedback loop provided through resistor 48. The high gain of the operational amplifier then causes diode 47 to cut off sharply by increasing its anode voltage sharply in a negative direction. Diode 44 then limits the operational amplifier output voltage to a predetermined negative value.

When the algebraic sum of the input voltage again swings negative, diode 44 begins to cut off, opening the feedback circuit through resistor 45. The high operational amplifier gain then causes diode 44 to cut off sharply by increasing its cathode voltage sharply in a positive direction. Diode 47 then limits the amplifier output voltage to a predetermined positive value. The net result is that when polarity of the algebraic sum of input voltages supplied to operational amplifier 40 reverses, output voltage abruptly changes from a large constant value of one polarity to a large constant value of the opposite polarity, and remains at the new large constant value and polarity until the polarity of input voltage again changes, at which time the output voltage returns to the former large constant voltage and polarity.

When the circuit of FIG. 6 is used as analog comparator 27 of FIG. 4, resistor 41 receives output voltage from integrator 23, resistor 42 receives input voltages from the heel of contact 16 and resistor 43 receives input voltages from the heel of contact 14. Similarly, if the circuit of FIG. 6 is used for analog comparator 25 of FIG. 4, resistor 41 receives input voltages from integrator 23, resistor 42 receives positive reference voltage from contact 21 of relay 22, and resistor 43 is left unconnected.

Since resistors 41, 42 and 43 are all of equal ohmic value, it can be seen that during existence of preferential offsets, the composite signal supplied to analog comparator 27 contains average volume information in the preferential direction only, and average lane occupancy information in the preferential direction only. Hence, this fact is reflected in the operation of output relay 29 of FIG. 4.

Contact 30 of FIG. 4, when closed, provides energy which may be transmitted over a line wire or used to operate a radiant energy transmitter. The composite sensor signal may then be transmitted over long distances by either radiant energy or wire means. At the receiving end of the communication circuit, a decoder may be situated, for use in generating volume, lane occupancy and speed signals from the composite sensor signal in a manner identical to that by which it would generate these parameters from any individual vehicle detector signal. Moreover, if the volume and lane occupancy analogs from which the composite sensor signal is derived are obtained from a computer which has generated them on the basis of long-term running averages, it is unnecessary to include a long time-constant filter on the output of the decoder in order to properly reproduce long-term volume, lane occupancy and speed signals. However, short-term filtering in the decoder is desirable, in order to obviate the possibility of sharp fluctuations in the output signals.

One type of decoder intended for use with the encoder of FIG. 4 is shown in FIG. 7. This circuit includes a decoder relay 60 which receives the composite sensor output signal supplied from front contact 30 of the encoder output relay of FIG. 4. Associated with the decoder relay are a first contact 61 used in reproducing volume information, a second contact 62, used in reproducing lane occupancy information, and third and fourth contacts 63 and 64, used in computing a traffic speed signal based upon the received composite sensor signal. The volume reproduction circuit includes a limiting resistor 65 coupled between front contact 61 and the input to a buffer or isolator amplifier 66. The isolator amplifier provides a high input impedance so as to avoid loading the input circuitry and producing an erroneous output signal, and provides a low output impedance for the purpose of operating meters, recorders, etc. The isolator amplifier has a gain of unity, as well as substantially zero D.C. offset voltage (referred to the input), so that its output and input voltages are identical over its operating range.

The input to isolator amplifier 66 is coupled to ground through a resistor 67 and a capacitor 68, connected in parallel. The heel of contact 61 is coupled to ground through a capacitor 69. Positive voltage is supplied to back contact 61 through a resistor 70. This voltage is closely regulated by a zener diode 71, which couples resistor 70 to the output of isolator 66. The zener diode maintains a constant potential difference between the output voltage of isolator 66 and the voltage supplied to back contact 61 in the form of a bootstrap arrangement. Hence, while decoder relay 60 is deenergized, capacitor 69 charges to a voltage which is the sum of the voltage on capacitor 68 and the constant reference voltage developed across zener diode 71. Each time relay 60 is energized, capacitor 69 supplies a fixed quantity of charge to capacitor 68, since capacitor 69 charges to a voltage which is a constant amount above the voltage on capacitor 68. The rate at which charge is supplied to capacitor 68 is thus determined by the rate at which relay 60 operates. The values of resistor 67 and capacitor 69 are chosen so as to provide any desired scale factor, while resistor 65 limits the amplitude of charging current for capacitor 68 through front contact 61.

The output voltage provided by isolator 66 represents volume data may be shown mathematically as follows: Let $Q_{2c}$=charge transferred out of capacitor 69 whenever relay 60 energizes,
$q_{2d}$=instantaneous charge constantly leaking from capacitor 68 through resistor 67 to ground,
$C_1$=value of capacitor 69, which is much larger than the value of capacitor 68,
$R_1$=value of resistor 67,
$i_1$=instantaneous leakage current from capacitor 68 through resistor 67,
$e_1$=instantaneous voltage at the junction common to resistor 70 and zener diode 71,
$e_2$=instantaneous voltage across capacitor 68,
$E_z$=constant voltage drop across zener diode 71,
$V$=average traffic volume, and
$t$=time.

Whenever relay 60 energizes, the amount of charge transfered out of capacitor 69 through resistor 65 may be expressed as $$Q_{2c}=C_1(e_1-e_2)$$

However, $$e_1-e_2=E_z$$

and therefore $$Q_{2c}=C_1E_z$$

Also, $$q_{2d}=i_1t=\frac{e_2}{R_1}t$$

During any interval of time T, capacitor 68 charges according to the expression $$\frac{Q_{2c}}{T}=VC_1E_z$$

where V is expressed in units of vehicles per interval of time T, and capacitor 68 discharges according to the expression $$\frac{\int_0^T q_{2d}dt}{T}=\frac{e_2}{R_1}$$

At equilibrium, the rate at which capacitor 68 is charged equals the rate at which it is discharged. Hence, $$\frac{Q_{2c}}{T}=\frac{\int_0^T q_{2d}dt}{T}$$

and $$VC_1E_z=\frac{e_2}{R_1}$$

Therefore, $$e_2=VC_1E_zR_1$$

and since $C_1$, $E_z$ and $R_1$ are all constants, $e_2$, which is the voltage across capacitor 68, is directly proportional to traffic volume, V. To summarize, therefore, a fixed quantity of charge is transferred to capacitor 68 from capacitor 69 each time relay 60 is energized. These fixed quantities of charges are accumulated by capacitor 68, and also leak off of capacitor 68 through resistor 67, so that the voltage appearing across capacitor 68 at any instant is dependent upon the rate at which it receives the fixed quantities of charge from capacitor 69. Since this rate is dependent upon traffic volume, the voltage on capacitor 68 is directly proportional to traffic volume.

The lane occupancy reproduction circuit includes limiting resistor 75 coupling contact 62 to the input of an isolator amplifier 77 which is identical in characteristics to isolator amplifier 66. Positive reference voltage is supplied to front contact 62, while back contact 62 is grounded. The input to isolator 77 is coupled to ground through a capacitor 78. Size of resistor 75 is so selected that the ratio of voltage stored on capacitor 78 to the reference voltage also represents the percentage of a predetermined duration of time during which relay 60 is energized, adjusted to a desired scale. Moreover, resistor 75 controls the RC time constant involved in charging and discharging capacitor 78 so as to provide smooth variation of output voltage from isolator 77.

The energized condition of relay 60 represents simulated detection of a vehicle, while the deenergized condition represents a simulated detection of no vehicle. The hypothetical vehicles so detected may be considered to constitute a statistical model of average traffic conditions over the entire length of monitored roadway. Moreover, relay 60 remains energized throughout the entire period in which each hypothetical vehicle is detected, and deenergized through the entire period in which no hypothetical vehicle is detected. During intervals in which relay 60 is energized, capacitor 78 charges; during intervals in which the relay is deenergized, capacitor 78 discharges. Hence, the voltage stored on capacitor 78 bears a proportional relationship to the total percentage of time during a fixed measuring period in which relay 60 is energized. This voltage has been defined as representing lane occupancy, or the total percentage of a fixed length of highway which is vehicle-occupied. This parameter is more fully discussed in H. C. Kendall et al. application Ser. No. 78,410, filed December 27, 1960.

If an average vehicle length is assumed, the parameter of lane occupancy may be converted to density by simply dividing the lane occupancy parameter by a constant representing an average length of vehicles detected. Hence, density information may also be supplied by the decoder, if desired.

The speed computing circuit includes a limiting resistor 85 coupling front contact 63 to the input of an isolator amplifier 86. This isolator amplifier is identical in characteristics and operation to isolator amplifiers 66 and 77. The input to isolator 86 is coupled to ground through a resistor 87 in series with front contact 64 whenever relay 60 is energized. In addition, a capacitor 88 couples the input of isolator amplifier 86 to ground. The heel of contact 63 is coupled to ground through a capacitor 89. Positive voltage is supplied to back contact 63 through a resistor 90. This voltage is closely regulated by a zener diode 91, which couples resistor 90 to the output of isolator 86 and thereby maintains a fixed potential difference between the output voltage of isolator 86 and the voltage supplied to back contact 63. Hence, capacitor 89 charges to a voltage which is the sum of the voltage on capacitor 88 and the fixed reference voltage across zener diode 91, while decoder relay 60 is deenergized. When relay 60 is energized, capacitor 89 supplies a fixed quantity of charge to capacitor 88, since capacitor 89 charges to a voltage which is a fixed amount above the voltage on capacitor 88. The rate at which charge is supplied to capacitor 88 is thus determined by the rate at which relay 60 operates. The values of resistor 87 and capacitor 89 are chosen so as to provide any desired scale factor, while resistor 85 limits the amplitude of charging current for capacitor 88 through front contact 63.

It will be noted that the speed computing circuit is identical to the volume reproduction circuit, with the exception that resistor 87 couples the input to isolator 86 to ground only during intervals in which decoder relay 60 is energized. Hence, leakage of charge from capacitor 88 to ground through resistor 87 occurs only during intervals in which relay 60 is energized. Average length of these intervals, in turn, is inversely proportional to average traffic speed, assuming an average length of vehicles in the traffic stream. Values of resistor 87 and capacitor 89 are chosen so as to set equilibrium voltage on capacitor 88 to a value representing average speed, as well as to provide the desired scale factor.

That output voltage provided by isolator 86 represents speed data may be proven mathematically as follows: Let $Q_{4c}$=charge transferred out of capacitor 89 whenever relay 60 energizes, $Q_{4d}$=charge leaked from capacitor 88 through resistor 87 to ground while relay 60 is energized, $C_3$=value of capacitor 89, which is much larger than the value of capacitor 88, $R_2$=value of resistor 87, $I$=average leakage current from capacitor 88 through resistor 87, $e_3$=instantaneous voltage at the junction common to resistor 90 and zener diode 91, $e_4$=instantaneous voltage across capacitor 88, $E$=constant voltage drop across zener diode 71, $V$=average traffic volume, $D$=average traffic density, $S$=average traffic speed, $L$=average traffic lane occupancy, $l$=average length of vehicles, $t_1$=average length of time during which relay 60 is energized in response to simulated detection of a single vehicle, and $n$=number of simulated vehicles detected during any specified interval.

Whenever relay 60 energizes, the amount of charge transferred out of capacitor 89 through resistor 85 may be expressed as $$Q_{4c}=C_3(e_3-e_4)$$

However, $$e_3-e_4=E$$

and therefore $$Q_{4c}=C_3E$$

Also, $$Q_{4d}=It_1=\frac{e_4}{R_2}t_1$$

During any interval of time T, capacitor 88 charges according to the expression $$\frac{Q_{4c}}{T}=VC_3E$$

where V is expressed in units of vehicles per period of time T, and capacitor 88 discharges according to the expression $$\frac{Q_{4d}}{T}=\frac{e_4}{R_2}\frac{t_1}{T}n$$

However, lane occupancy is measured by the ratio of the total length of time during which relay 60 is energized throughout a specified interval to the length of that interval, or $$L=\frac{nt_1}{T}$$

Hence, $$\frac{Q_{4d}}{T}=\frac{e_4}{R_2}L$$

At equilibrium, the rate at which capacitor 88 is charged equals the rate at which it is discharged. Hence $$\frac{Q_{4c}}{T}=\frac{Q_{4d}}{T}$$

and $$VC_3E=\frac{e_4}{R_2}L$$

Therefore, $$e_4=\frac{VC_3ER_2}{L}$$

However, average volume may be expressed as the product of average speed and average density, or $$V=SD$$

Moreover, average lane occupancy may be expressed as the product of average density and the average length of vehicles in the stream of traffic, or $$L=Dl$$

Hence, the expression for voltage $e_4$ may be written $$e_4=\frac{SC_3ER_2}{l}$$

Since $C_3$, E, $R_2$ and $l$ are all constants, voltage $e_4$ is directly proportional to average speed S.

Those skilled in the art will recognize that it is not absolutely essential that volume signals be supplied to contacts 13 and 15, and that lane occupancy signals be supplied to contacts 14 and 16, as shown in FIG. 4. Instead, lane occupancy signals may be supplied to contacts 13 and 15, and volume signals may be supplied to contacts 14 and 16. This would have the effect of producing a composite signal of pulse repetition rate dependent upon average lane occupancy and duty cycle dependent upon average volume. To properly decode this signal, it is merely necessary to exchange lane occupancy and volume labels at the output of the decoder of FIG. 7. Voltage provided at the output of the speed decoder would then vary inversely as the average traffic speed. Moreover, if preferred, any other types of volume, lane occupancy and speed computers may be utilized in the decoder, provided they are adapted to receive input information from presence-type vehicle detectors. Similarly, the volume, lane occupancy and speed computers disclosed in FIG. 7 may be used independently for providing traffic data as received from vehicle presence detectors.

Thus, there has been shown a system for creating and communicating a composite sensor signal wherein the repetition rate of the signal is a function of average volume and the duty cycle is a function of average lane occupancy, as well as means for decoding the signal at the receiving station. By using the techniques described herein, average speed may be computed when average lane occupancy and average volume are known. The system provides a great advantage by economizing on the need for interconnecting equipment, since only one communication channel is required for simultaneous transmission of much traffic data.

Although but one embodiment of the present invention has been described, it is to be specifically understood that this form is selected to facilitate in the disclosure of the invention rather than to limit the number of forms which it may assume; various modifications and adaptations may be applied to the specific form shown to meet requirements of practice, without in any manner departing from the spirit or scope of the invention.

What is claimed is:

1. In a system for communicating average volume and average lane occupancy data over a single communication channel, the combination comprising an encoder, said encoder including means responsive to a voltage analog of average volume for repetitively generating a sawtooth voltage of slope dependent upon the average volume and switching means responsive to the sawtooth voltage generating means and a voltage analog of average lane occupancy for providing an output voltage of a first amplitude when the average lane occupancy voltage amplitude exceeds the sawtooth voltage amplitude and an output voltage of a second amplitude when the sawtooth voltage amplitude exceeds the average lane occupancy voltage amplitude, and a decoder, said decoder including digital-to-analog conversion means for providing average volume and average lane occupancy analog voltages in response to said first and second output voltage amplitudes.

2. In a system for combining traffic data from a plurality of vehicle detectors into the form of a single detector signal, the combination comprising means generating voltage analogs of average volume and average lane occupancy based upon data supplied by the detectors, means responsive to the voltage analog of average volume for repetitively generating a sawtooth voltage of slope dependent upon the average volume, and comparator means responsive to the sawtooth voltage and a voltage analog of average lane occupancy for providing an output voltage of first amplitude when the average lane occupancy voltage amplitude exceeds the sawtooth voltage amplitude and an output voltage of a second amplitude when the sawtooth voltage amplitude exceeds the average lane occupancy voltage amplitude.

3. In a system for providing a single signal having the form of a vehicle detector signal in response to received analog volume and lane occupancy voltages, the combination comprising means integrating the voltage analog of average volume, means resetting the integrating means when the integrated voltage amplitude reaches a predetermined level, and comparator means responsive to the integrating means and a voltage analog of average lane occupancy for providing an output voltage of a first amplitude when the average lane occupancy voltage amplitude exceeds the integrated voltage amplitude and an output voltage of a second amplitude when the integrated voltage amplitude exceeds the average lane occupancy voltage amplitude.

4. In a system for communicating average volume and average lane occupancy data over a single communication channel, the combination comprising an encoder, said encoder including integrator means responsive to a voltage analog of average volume for providing a voltage pulse of slope dependent upon the average volume, means responsive to the amplitude of the integrator output voltage for resetting the integrator when said output voltage amplitude reaches a predetermined level, and comparator means responsive to the integrator output voltage and a voltage analog of average lane occupancy for producing a voltage of a first amplitude when the average lane occupancy voltage amplitude exceeds the integrator output voltage amplitude and a voltage of a second amplitude when the integrator output voltage amplitude exceeds the average lane occupancy voltage amplitude, and a decoder, said decoder including switching means operable to one of two conditions in response to said first and second voltage amplitudes and computing means for providing traffic parameter analog voltages in response to actuations of the switching means.

5. In a system for communicating average volume and average lane occupancy data over a single communication channel, the combination comprising an encoder, said encoder including integrator means responsive to a voltage analog of average volume for providing a voltage pulse of slope dependent upon the average volume, first analog comparator means responsive to the integrator output voltage and a fixed reference voltage for resetting the integrator whenever the magnitude of integrator output voltage rises above the magnitude of the reference voltage, and second analog comparator means responsive to the integrator output voltage and a voltage analog of average lane occupancy for providing a voltage of a first amplitude when the algebraic sum of the average lane occupancy voltage and the integrator output voltage amplitude is of one polarity and a voltage of a second of a second amplitude when the algebraic sum of the integrator output voltage amplitude and the average lane occupancy voltage amplitude is of the oposite polarity, and a decoder, said decoder including switching means operable to one of two conditions in response to said first and second voltage amplitudes and computing means providing voltage analogs of said average volume and average lane occupancy in response to operations of the switching means.

6. In a system for communicating average volume and average lane occupancy data over a single communication channel, the combination comprising an encoder, said encoder including means responsive to a voltage analog of average lane occupancy for repetitively generating a sawtooth voltage of slope dependent upon the average lane occupancy and comparator means responsive to the sawtooth voltage generating means and a voltage analog of average volume for providing an output voltage of a first amplitude when the average volume voltage amplitude exceeds the sawtooth voltage amplitude and an output voltage of a second amplitude when the sawtooth voltage amplitude exceeds the average volume voltage amplitude, and a decoder, said decoder including switching means operable to one of two conditions in response to said first and second output voltage amplitudes and analog computing means providing traffic parameter analog voltages in response to operation of the switching means.

7. In a system for communicating first and second manifestations of traffic data over a single communication channel, the combination comprising an encoder, said encoder including means responsive to a voltage analog of the first manifestation for repetitively generating a sawtooth voltage of slope dependent upon the size of the first manifestation and switching means responsive to the sawtooth voltage generating means and a voltage analog of the second manifestation for providing an output voltage of a first amplitude when the analog voltage amplitude of the second manifestation exceeds the sawtooth voltage amplitude and an output voltage of a second amplitude when the sawtooth voltage amplitude exceeds the analog voltage amplitude of the second manifestation, and a decoder, said decoder including digital-to-analog conversion means for providing voltage analogs of the first and second manifestations in response to said first and second output voltage amplitudes.

8. In a system for communicating first and second manifestations of traffic data over a single communication channel, the combination comprising an encoder, said encoder including means responsive to a voltage analog of the first manifestation for repetitively generating a sawtooth voltage of slope dependent upon the size of the first manifestation and comparator means responsive to the sawtooth voltage generating means and a voltage analog of the second manifestation for providing an output voltage of a first amplitude when the analog voltage amplitude of the second manifestation exceeds the sawtooth voltage amplitude and an output voltage of a second amplitude when the sawtooth voltage amplitude exceeds the voltage amplitude of the analog of the second manifestation, and a decoder, said decoder including switching means operable to one of two conditions in response to said first and second output voltage amplitudes and analog computing means providing voltage analog of the first and second manifestations in response to operation of the switching means.

9. The system for communicating first and second manifestations of traffic data over a single communication channel of claim 8 wherein the encoder includes switching means responsive to preferential offsets for coupling the voltage analogs of the first and second manifestations as sensed only in the preferential direction to said sawtooth voltage generating means and said comparator means, respectively.

10. In a system for combining traffic data from a plurality of vehicle detectors into the form of single detector signal, the combination comprising means generating voltage analogs of first and second traffic parameters based upon data supplied by the detectors, means responsive to the voltage analog of the first parameter for repetitively generating a sawtooth voltage of slope dependent upon the size of the first parameter, and comparator means responsive to the sawtooth voltage and the second parameter voltage analog for providing an output voltage of a first amplitude when the second parameter analog voltage amplitude exceeds the sawtooth voltage amplitude and an output voltage of a second amplitude when the sawtooth voltage amplitude exceeds the second parameter analog voltage amplitude.

No references cited.

NEIL C. READ, *Primary Examiner.*

THOMAS B. HABECKER, *Examiner.*